May 17, 1949. T. D. DRITZ 2,470,607
TRACTION DEVICE
Filed June 26, 1947
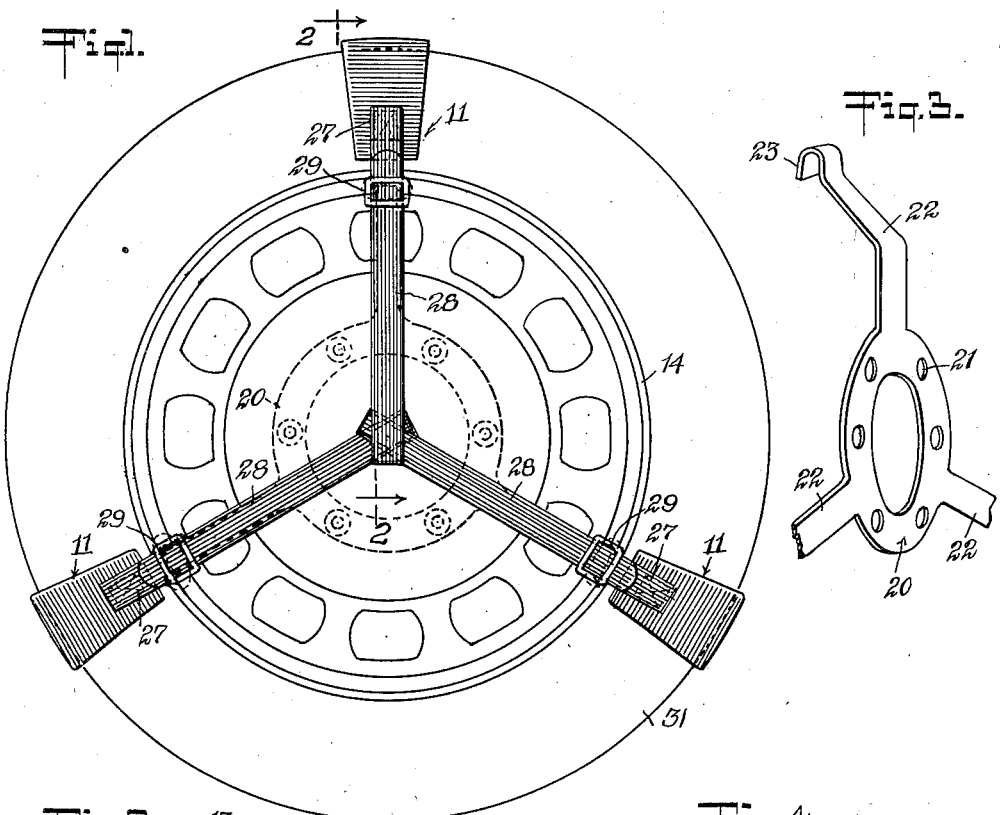
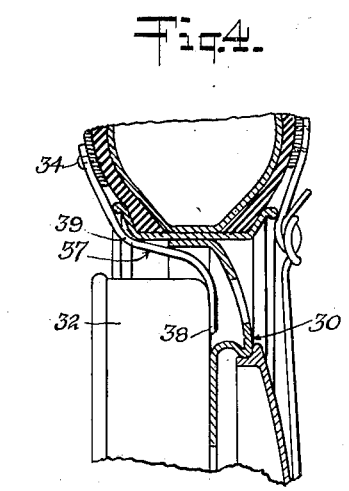
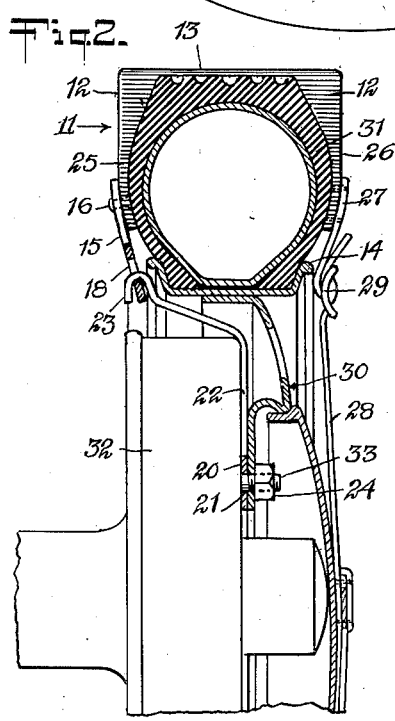
INVENTOR.
Theodore D. Dritz
BY
Munn, Liddy & Glaccum
Attorneys Patented May 17, 1949

2,470,607

UNITED STATES PATENT OFFICE 2,470,607

TRACTION DEVICE

Theodore D. Dritz, Mount Vernon, N. Y.

Application June 26, 1947, Serial No. 757,110

3 Claims. (Cl. 152—221)

My invention relates to traction devices and, more particularly, to a traction device adapted to be secured to the wheel of an automobile or similar vehicles.

My principal objective was to design a device that would afford a maximum of traction through a new and novel structure. Heretofore, in similar devices such as skid chains, etc., the chain affords little traction surface for the wheel. My device has a thin base which fits against the tread of a tire and thick sides or shoulder portions that extend up along the side of the tire almost to the rim. This device is also form fitting in that it closely adheres to the outside shape of the tire and affords a maximum of traction and gripping surface to the side walls of the tire.

A further advantage of my device is the means by which it is secured to the wheel of the vehicle. I utilize a spider or a disc with arms that may be permanently affixed to the vehicle between the drum and the wheel. Through the use of this device, the straps holding the traction element to the wheel extend parallel to the wheel of the vehicle assuring a snug fit between the traction device and the tire at all times. This eliminates the usual method of securing these devices to the wheel which consists of extending the straps through the openings in the wheel and around the tire. The disadvantage of this method allows the traction device or skid chain to move back and forth and does not furnish a secure gripping means between the tire and skid chain.

A further advantage of my device is that it has a minimum thickness of rubber fitting over the tread surface of the tire assuring a smooth and even ride when on level pavements. This would also obviate the necessity of removing the device when smooth pavement is reached which heretofore has been necessary when skid chains or similar devices are used.

Another feature is that my traction device is of great width which prevents it from slipping on the tire or having a tendency to turn over when in operation as the conventional skid chains have a tendency to do.

Further advantages and unique features of my device will be apparent as I proceed with the description.

With reference to the drawings—

Fig. 1 shows a side elevation illustrating my device attached to the conventional auto wheel and tire;

Fig. 2 shows a sectional view on line 2—2 of Fig. 1;

Fig. 3 shows a partial perspective view of my attaching means; and

Fig. 4 shows a view similar to Fig. 2 illustrating a modification of the attaching means.

As shown in Fig. 2, my traction element consists of a flexible pad 11 which can be made of rubber or other similar material. The pad 11 has a thin base 13 that is positioned next to the tread of the tire 31 and sides 25 and 26 extending up the outer periphery of the tire 31 to a point near the rim 14 of the wheel 30 of the vehicle.

At the transition point, where the side wall and tread of the tire 31 meet, the pad 11 is equipped with large shoulders 12 which constitute the main traction surface of the pad 11. The sides 25 and 26 of the pad 11 are wide and have a slight taper as they extend up and around the outer periphery of the tire 31. Affixed to the side 26 through stitching or other means are straps 27 which can be made of canvas or other similar material. Affixed to side 25 is a metal strip 15 which is secured to the element 10 through rivets 16. The metal strip 15, near its free end, has a hole 18. The attaching means for securing and holding the pad 11 to the tire 31 of the wheel 30 is comprised of a spider or disc with arms 20. In its preferred form, the spider 20 has three radial arms 22. However, this number may be varied depending on the number of pads 11 that are to be affixed to the tire 31. The spider 20 is equipped with holes 21 which are adapted to receive the lugs 33 that are affixed to the drum 32 of the vehicle. To mount the spider 20, the wheel 30 of the vehicle is removed and the spider 20 is placed over the lugs 33. The wheel 30 is then replaced and through lug nuts 24 the spider 20 is secured in place between the drum 32 and the wheel 30 of the vehicle. The arms 22 of the spider 20 extend parallel to the surface of the drum 32 until they reach the outer edge of the drum where they are bent at an angle and project inwardly over the upper surface of the drum 32. The end of each arm 22 is shaped to form a hook 23 which is adapted to engage in the hole 18 of the metal strip 15.

In mounting the pad 11 to the tire 31, as shown in Fig. 2, the hole 18 of the metal strip 15 is engaged on the hook 23 of the spider 20. As stated, in its preferred form three pads 11 will be secured to each tire 31. When each pad 11 has been placed in the desired position, the straps 27 are then secured to the straps 28 through the adjustable buckle 29. One end of the straps 28, as shown in Fig. 1, extends radially toward the pads 11 while the opposite ends are secured together at the center of the wheel 30 through stitching or other similar means. It is noted that this type of mounting assures a snug fit between the pad 11 and the tire 31, as a result of the straps 27 and 28 and the strip 15 being substantially parallel to the face of the wheel 30.

Fig. 4 illustrates a further modification of my device in which a specially shaped metal strip 37 replaces the metal strip 15 and the spider 20. One end of the strip 37 is secured to the side 25 of the pad 11 through rivets 34 or other means and its opposite end passes over the drum 32 of the wheel 30 and the end projection 38 of the strip 37 extends parallel to and flush against the face of the drum 32. The strip 37 has a curved portion 39 that fits snugly against the rim 14 preventing any movement of the strip 37 when the straps 28 have been tightly secured to straps 27 through the buckles 29.

In placing this modification on the wheel, the strip 37 is brought from the rear and between the rim 14 and the upper surface of the drum 32. The projection 38 will extend flush against the outer edge of the drum 32 while the curved portion 39 will be forced against the rim 14. The straps 27 are then attached to the straps 28 through the buckle 29 and due to the shape of the metal strip 37 when sufficient tension has been placed on the straps it will be held securely in place.

My device will be extremely useful in those cases in which the vehicle has become mired in mud or deep snow. The pad 11 not only increases the tread area of the tire, but the shoulder portions 12 furnish effective gripping surfaces on the sides of the tire that will anchor in the mud or snow when the wheels revolve, enabling the vehicle to quickly extricate itself from the material in which it is mired. Also, due to the width of the pads 11 and the means by which they are secured to the tires 30, there is no possibility of them slipping on the tire or having a tendency to curl under as many of the conventional anti-skid and traction devices have a tendency to do.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. A traction device for a vehicle wheel having a pneumatic tire, said device comprising a plurality of flexible pads adapted to be arranged on the tire, said pads having a base, shoulder portions, and attaching means secured to both ends of said pads, said base being relatively thin and adapted to be fitted over the tread of said tire, said shoulder portions disposed at opposite sides on the walls of said tire, means adapted to be secured to the wheel and detachably engageable with said pad, said means comprising a circular spider with a plurality of radial arms extending therefrom, hooks on said arms adapted to engage said attaching means at one end of said pads, the opposite ends of said pads being connected together through a strap arrangement whereby said pads will be maintained in operable position when said wheel revolves.

2. A traction device for a vehicle wheel having a pneumatic tire, including a plurality of flexible pads adapted to be arranged on the tire and a circular spider secured to the wheel, said pads having a base, shoulder portions and attaching means secured to both ends of said pads, said base being relatively thin and adapted to be fitted over the tread of the tire, said shoulder portion disposed at opposite sides on the walls of said tire, said spider having a plurality of radial arms extending therefrom, hooks on said arms adapted to detachably engage said attaching means at one end of said pads, the opposite ends of said pads being connected together through a strap arrangement whereby said pads will be maintained in operable position when said wheel revolves.

3. A device as set forth in claim 2 in which said attaching means comprise metal plates equipped with holes secured to one end of said pads and straps having buckles secured to the opposite ends of said pads.

THEODORE D. DRITZ.

REFERENCES CITED

The following references are of record in the file of this patent:

UNITED STATES PATENTS

| Number | Name | Date |
|---|---|---|
| 923,456 | Stevenson | June 1, 1909 |
| 2,195,982 | Daley | Apr. 30, 1940 |
| 2,198,883 | Pattison | Apr. 12, 1940 |